US008269779B2

(12) United States Patent
Rogers et al.

(10) Patent No.: US 8,269,779 B2
(45) Date of Patent: Sep. 18, 2012

(54) DEVELOPMENT TOOLS FOR ANIMATED CHARACTER RIGGING

(75) Inventors: Michael Rogers, Hulme (GB); Kevin Walker, Totley (GB); Steven Caulkin, Hale (GB); Gareth Edwards, Cheshire (GB)

(73) Assignee: Image Metrics Limited, Manchester (GB)

( * ) Notice: Subject to any disclaimer, the term of this patent is extended or adjusted under 35 U.S.C. 154(b) by 0 days.

(21) Appl. No.: 13/214,814

(22) Filed: Aug. 22, 2011

(65) Prior Publication Data

US 2011/0304622 A1    Dec. 15, 2011

Related U.S. Application Data

(63) Continuation of application No. 11/742,135, filed on Apr. 30, 2007, now Pat. No. 8,026,917.

(60) Provisional application No. 60/796,412, filed on May 1, 2006.

(51) Int. Cl.
    *G06T 13/00*    (2011.01)
(52) U.S. Cl. ............................. 345/473; 345/419; 345/420
(58) Field of Classification Search ........................ None
    See application file for complete search history.

(56) References Cited

U.S. PATENT DOCUMENTS

| | | | | |
|---|---|---|---|---|
| 6,057,859 A * | 5/2000 | Handelman et al. | ........... | 345/474 |
| 6,414,684 B1 * | 7/2002 | Mochizuki et al. | ............ | 345/473 |
| 6,466,213 B2 * | 10/2002 | Bickmore et al. | ............ | 345/473 |
| 2004/0056871 A1 * | 3/2004 | Milliron | ......................... | 345/647 |
| 2004/0135788 A1 * | 7/2004 | Davidson et al. | ............. | 345/530 |
| 2005/0219250 A1 * | 10/2005 | Sepulveda | ..................... | 345/473 |
| 2006/0134585 A1 * | 6/2006 | Adamo-Villani et al. | ..... | 434/112 |
| 2006/0274070 A1 * | 12/2006 | Herman et al. | ................ | 345/474 |

OTHER PUBLICATIONS

Zaman, N., A Sketch-Based Interface for Parametric Character Modeling, Jan. 2006, Tesis Presented to Graduate School of Cornell University, pp. 1-190.*

* cited by examiner

*Primary Examiner* — Said Broome
(74) *Attorney, Agent, or Firm* — Sunstein Kann Murphy & Timbers LLP

(57) ABSTRACT

Computer-implemented methods and computer program products for automatically transferring expressions between rigs with consistent joint structure, and for automatically transferring skin weights between different skin meshes based on joint positioning. A method is provided for transferring an expression between a plurality of source rigs and a target rig, where each rig characterizes an animated character, and each rig, in turn, is characterized by a set of joints and a skin mesh having a plurality of vertices, with each vertex characterized by a matrix of weights relating a response of the vertex to movement of associated joints. A set of offsets is calculated of joint positions of a goal expression of each source rig relative to a neutral expression of the source rig. A scaling transformation is then applied to the set of offsets to produce a scaled set of offsets, which are added, in turn, to a neutral expression of the target rig. Methods are also provided for transferring a set of skin weights between the source rigs and the target rig.

2 Claims, 6 Drawing Sheets

DEVELOPMENT TOOLS FOR ANIMATED CHARACTER RIGGING

The present application is a continuation of copending U.S. patent application Ser. No. 11/742,135, currently allowed, and, like that application, claims the priority of U.S. Provisional Patent Application Ser. No. 60/796,412, filed May 1, 2006. Both of the foregoing applications are incorporated herein by reference.

TECHNICAL FIELD

The present invention relates generally to methods and computer tools for automated transfer of expressions, or other characteristic features, in the development of rigs for animated characters.

BACKGROUND ART

An animated character rig consists of a joint hierarchy connected to a skin mesh, together defining the topology of some portion of a character's anatomy, typically the character's head. An example of such a rig is shown in FIG. 1. In a head rig, altering the positions of the joints serves as a mechanism for manipulating expressions.

The current state of the art in animation of heads is provided in Richie et al., "The Art of Rigging", (CG Toolkit, 2005), which is incorporated herein by reference.

Joints of a head rig may be represented as a set of m vectors $(x_i, y_i, z_i)$. One or more of the joints is assigned to each vertex of a skin mesh, each with an associated weighting value, which defines how much a specific joint or combination of joints influences the vertex in a deformation process as the joints undergo motion.

Skin meshes are defined by sets of connected vertices. The movement of each vertex is determined by a weighted linear combination of joint movements. A vector of skin weights is stored with respect to each vertex, where the elements of each vector represent the influence of each joint on the particular vertex. A rigged character has all skin weights set to produce realistic skin deformation as joints move. Producing such a set of skin weights is a time-consuming and highly skilled task.

By virtue of the association of joints and skin mesh vertices, each joint causes a set of vertices of the skin mesh to move in a weighted linear manner. An expression is created by adjusting joint positions and setting skin weights until the desired skin shape is achieved.

In accordance with current practice, skin weights are static for each rig and affect the topology of all expressions. Defining skin weights ("skinning") for a character is a time-consuming and skilled process, as care must be taken to ensure a good skin topology for all realistic joint positions.

During character creation ("rigging"), each rig requires a number of basic expressions to be defined, for example mouth open, smile, left eye blink, raise brows, etc. These basic expressions will be combined linearly by an animator to produce a full range of realistic facial appearance. It is typically required to define around 100 basic expressions to allow animators to achieve realistic results. Each of these basic expressions must be replicated across every rig to provide animators with a consistent character interface. The process of replicating each basic expression for every rig in development is time consuming and potentially error prone when performed manually.

For these reasons, there is a clear need for automatic methods of transferring skin weights, and joint positions defining expressions, between rigs.

SUMMARY OF THE INVENTION

In accordance with preferred embodiments of the present invention, methods and computer program codes are provided for
automatic transfer of expressions between rigs with consistent joint structure, and the
automatic transfer of skin weights between different skin meshes based on joint positioning.

In certain embodiments of the invention, a method is provided for transferring an expression between a source rig and a target rig. Each rig characterizes an animated character, and each rig, in turn, is characterized by a set of joints and a skin mesh having a plurality of vertices, with each vertex characterized by a matrix of weights relating a response of the vertex to movement of associated joints. The method has steps of:
a. calculating a set of offsets of joint positions of a goal expression of the source rig relative to a neutral expression of the source rig;
b. applying a scaling transformation to the set of offsets to produce a scaled set of offsets; and
c. vectorially adding the scaled set of offsets to a neutral expression of the target rig so as to obtain a goal expression of the target rig.

In other embodiments of the invention, the step of applying a scaling transformation may include applying a scale calculated to account for ratios of extents of specified features between the neutral expressions of the source rig and the target rig. The step of applying a scaling transformation may also include applying a scale based upon interpolation among neutral shapes of a set of training data, and applying a scale based upon interpolation among neutral shapes of a set of training data using a radial basis function spline.

In accordance with other aspects of the present invention, a method is provided for transferring a set of skin weights between a source rig and a target rig. The method includes steps of:
a. mapping joints of the target rig to joints of the source rig by means of a transform function derived on the basis of interpolation; and
b. transforming vertices of the target skin by means of the said transform function thereby deriving a plurality of transformed target vertices.

The method may additionally include steps of:
a. identifying source skin polynomials intersecting a normal to a specified transformed target vertex;
b. choosing a source skin polygon to associate with each transformed target vertex; and
c. identifying the transformed target vertex with the intersection of a normal to the transformed target vertex with the chosen source skin polygon.

More particularly, the step of choosing a source skin polygon may include identifying a closest source skin polygon to the normal to each transformed target vertex.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In accordance with preferred embodiments of the present invention, a process is provided whereby expressions may be transferred automatically from one, or more, source rigs to one, or more, target rigs. An objective of the invention is to respect differences in the neutral shapes of the source and target rigs.

The techniques described herein are applied advantageously, although without limitation, to cases where character animation is driven by dynamic joint positions and skin weights which are static once they have been defined. The description that follows will be in terms of static skin weights, and the term "expression" will be used in the generalized sense of an array of configurations of the joint positions and coupled skin mesh characterizing some recognizable feature, such as an emotion, of the animated character.

Figure 1:
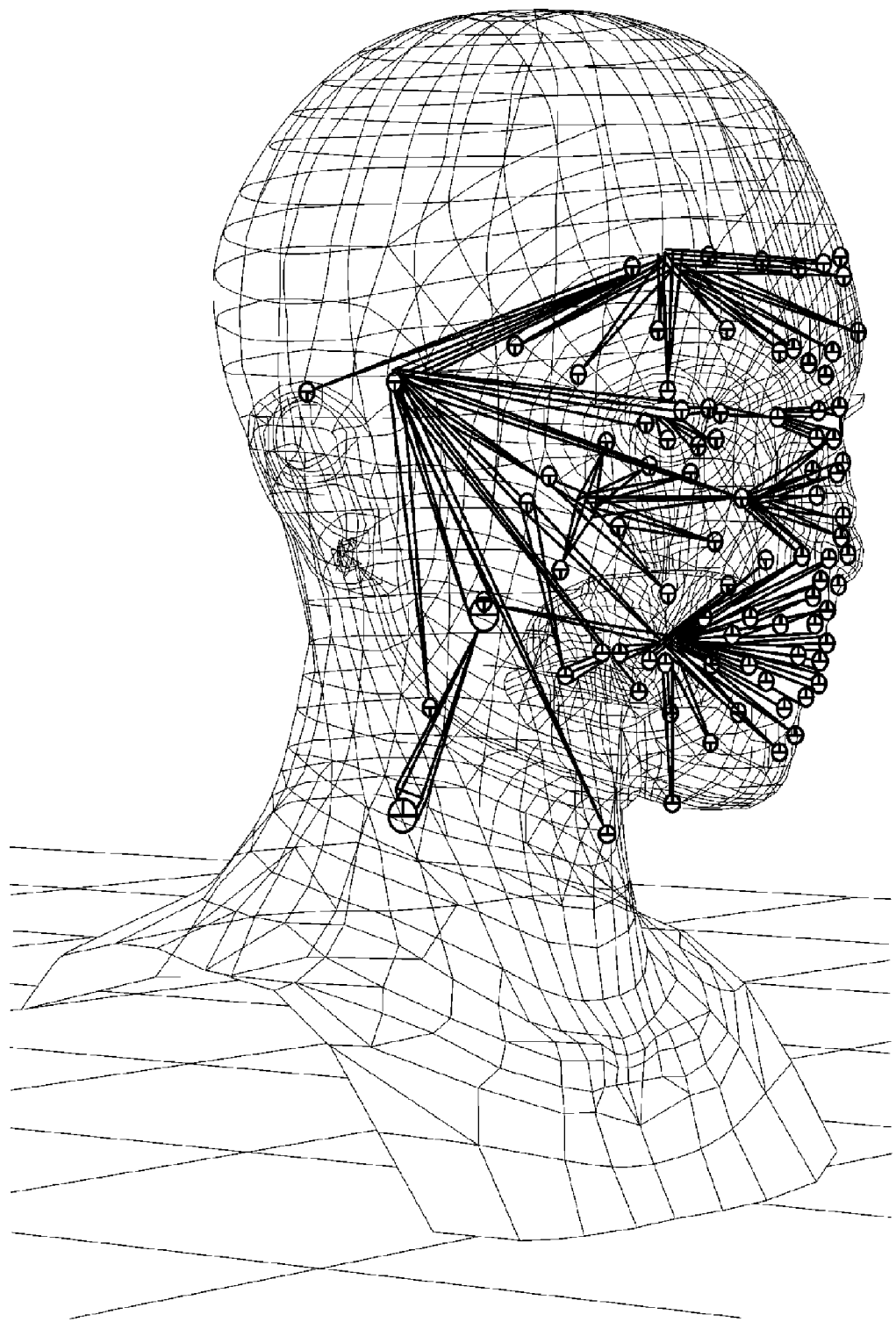
FIG. 1 shows a typical character rig with a joint hierarchy (dark lines) overlaid, in part, with a skin mesh (light lines)
Figure 2:
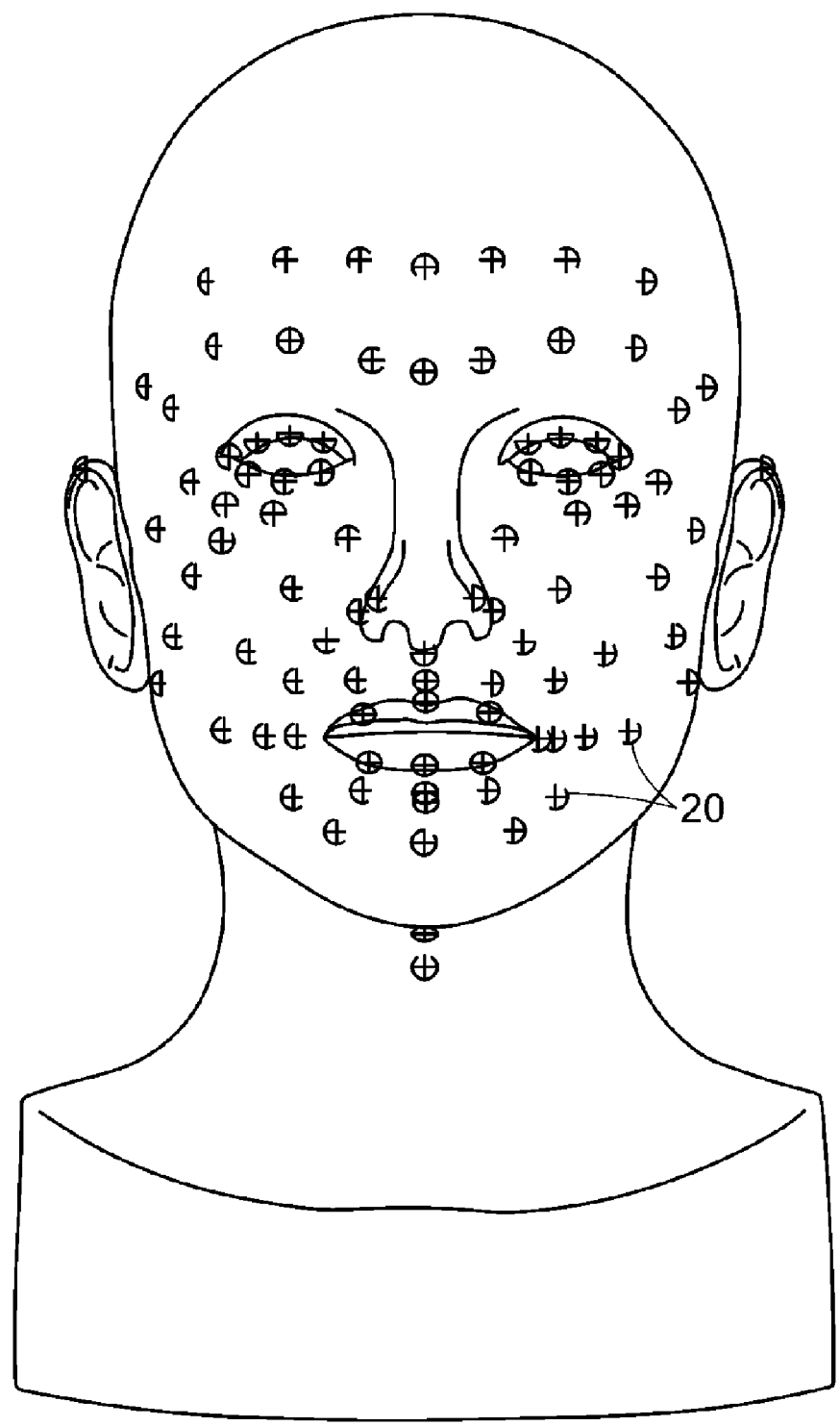
FIG. 2 shows an example of a neutral expression.

It is assumed that an expression illustrating a resting pose (referred to herein as a "neutral expression", and, typically, a facial pose) is available for both a source rig and a target rig. FIG. 2 is an example of a neutral expression. In this and subsequent figures, representative joints 20 are indicated. Only a neutral expression (or "shape") need be available for the target rig.

Figure 3:
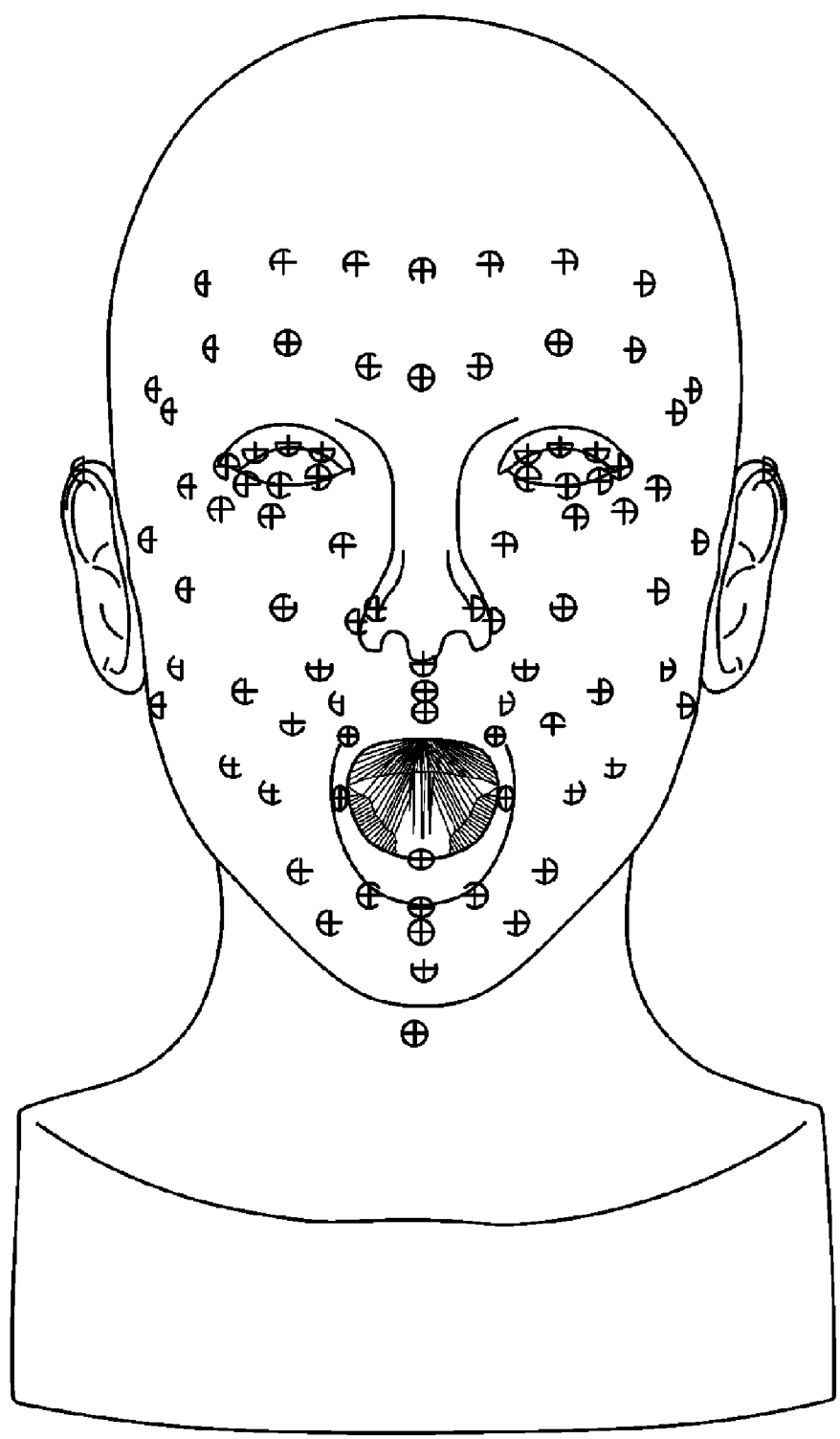
FIG. 3 shows an example of a goal expression on a source rig.

Additionally, a "goal expression," which is to be transferred to the target rig, is available for a set of one or more source rigs. FIG. 3 shows an example of a goal expression, in particular, an expression with an open mouth.

It is to be understood that while the present invention is described in terms of "expressions" as applied to a head of an animated character, it is to be understood that analogous deformations of an anatomical feature relative to a neutral version of the same anatomical feature may be transferred, in accordance with the teachings of the present invention, in a manner identical to that taught herein with respect to facial expressions, and that such methods of transferring anatomical feature deformations are within the scope of the present invention as claimed in any appended claims.

Expression Transfer from a Single Source Rig with Local Feature Group Scaling

Figure 4:
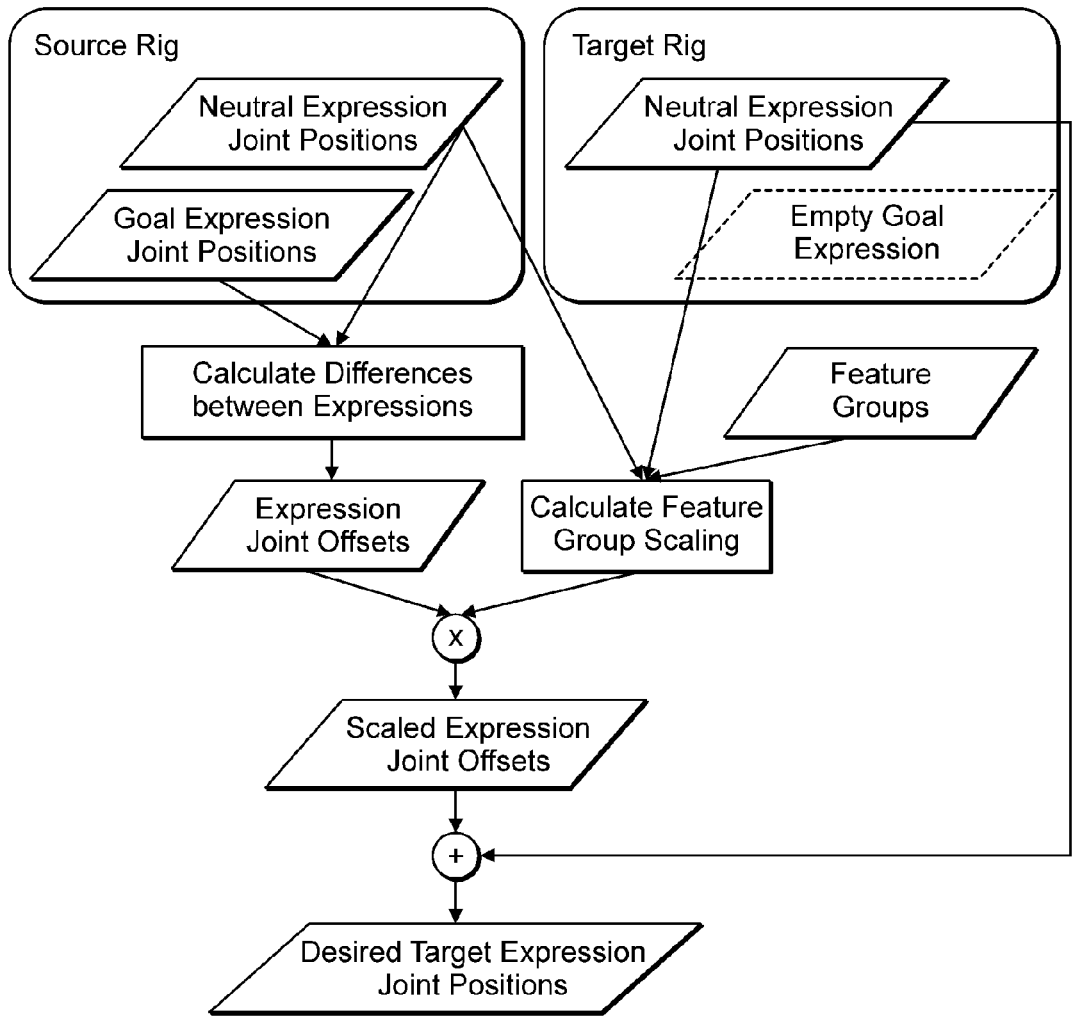
FIG. 4 is a schematic diagram of the expression transfer process with local feature group scaling, in accordance with a preferred embodiment of the present invention.

A method in accordance with one embodiment of the invention is now described with reference to FIG. 4. The basic process of the method is to calculate joint position offsets associated with the goal expression. This is done by subtracting the goal expression joint positions from the neutral expression joint positions of the source rig. These offsets are vectorially added to the target rig's neutral joint positions to produce a goal expression in the target rig.

In accordance with another embodiment of the invention, local scale factors may be integrated, as now described. Joints associated with physically meaningful structures are grouped. Examples of structural joint groupings include, for example joints controlling the right cheek, mouth, upper lip etc. The spatial extent of each group is calculated for the neutral expression of both source and target rigs. A scale is calculated for each group as the ratio between source extent and target extent. These scale factors represent the difference in relative size of various facial features. For example, transferring an expression by the process to a character with a large mouth, relative to the rest of its features, will produce a larger scaling factor for mouth joints. The factors are integrated into the expression transfer method by multiplying joint offsets by an appropriate feature group scale prior to addition to the target neutral expression.

Expression Transfer from a Plurality of Source Rigs

Figure 5:
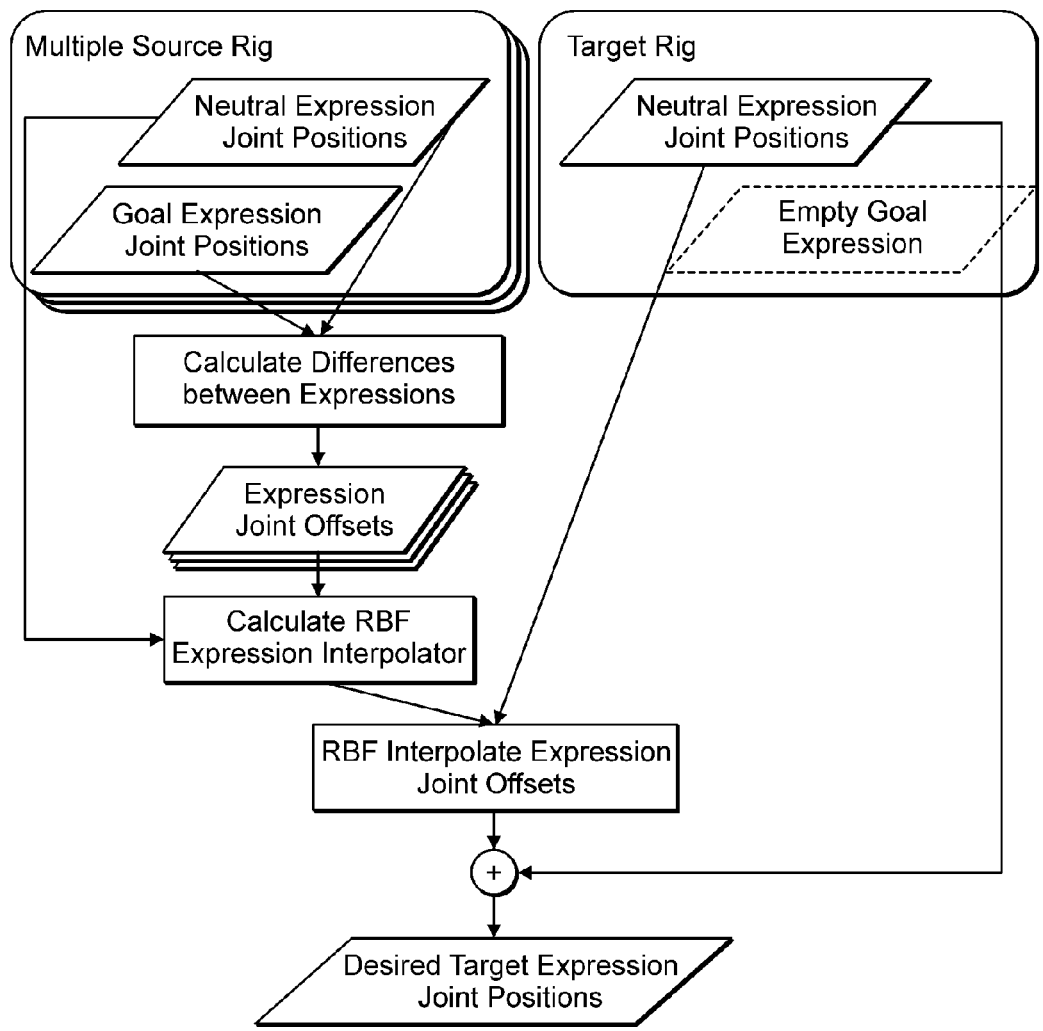
FIG. 5 is a schematic diagram of expression transfer using multiple source expressions, in accordance with an alternate embodiment of the present invention.

A method in accordance with a further embodiment of the invention is now described with reference to FIG. 5. As stated above, the shape of a rig's neutral expression influences the shape of a goal expression. The relationship between neutral and goal expression shape can be automatically estimated if a set of training data is available. There exists a mapping between neutral shape and goal expression offsets which captures this relationship without manual definition of physically meaningful groups of joints and calculation of local scales.

To estimate the mapping between neutral shape and goal expression offsets, a set of source rigs with defined neutral and goal expressions is required. Once calculated, the mapping can be used to interpolate joint position offsets for any unseen neutral expression shape. The mapping may contain linear (reflecting global scaling) and non-linear components (reflecting local scaling). For this reason, in accordance with preferred embodiments of the invention, the mapping may be represented by a Radial Basis Function (RBF) spline. A description of an RBF spline is provided by Wahba, *Spline Models for Observational Data*, in *CBMS—NSF Regional Conference Series in Applied Mathematics*, (SIAM, 1990), which is incorporated herein by reference.

The RBF interpolator is calculated as follows. Neutral expression are represented as a vector of joint positions $x_i = (x_1, y_1, z_1, x_2, y_2, z_2, \ldots, x_m, y_m, z_m)$, where $(x_i, y_i, z_i)$ are the 3-D coordinates of the i-th joint and m is the number of joints. The training set of n neutral expressions are represented as an (n×m) matrix X where the i-th row equals $x_i$. The goal expression joint offsets are represented in the same way in the matrix Y.

The RBF function smoothly interpolates the required mapping between training data sites and has the form:

$$f(x_i) = a_0 + a_1 x_i + \sum_{j=1}^{n} b_j U(\|x_i - x_j\|), \qquad (1)$$

where $a_0$ and $a_1$ are linear parameters, b is a vector of RBF parameters, $\|\cdot\|$ indicates the length of a vector and $U(r)$ is the basis function of the mapping. $U(r)$ is chosen to be one of: $U(r)=|r|$, $U(r)=r^2 \log r$ or $U(r)=|r|^3$, each of which impose different smoothness constraints on the final interpolation, and the use of any other basis function is within the scope of the present invention as claimed. With the interpolation constraints $f(x_i)=y_i$, the coefficients of equation (1) can be determined by solving the following matrix equations:

$$Y = Aa + Bb,$$

$$B^t a = 0, \qquad (2)$$

where $a=(a_0,a_1)$, A is a (n×n) matrix with $A_{ij}=U(\|x_i-x_j\|)$ and B is an (n×m+1) matrix whose rows are $(x_i,1)$. Applying the RBF to an unseen neutral expression produces an interpolated set of joint offsets which are used, as described above, to construct the goal expression with respect to the neutral expression of the target.

Skin Weight Transfer

Figure 6:
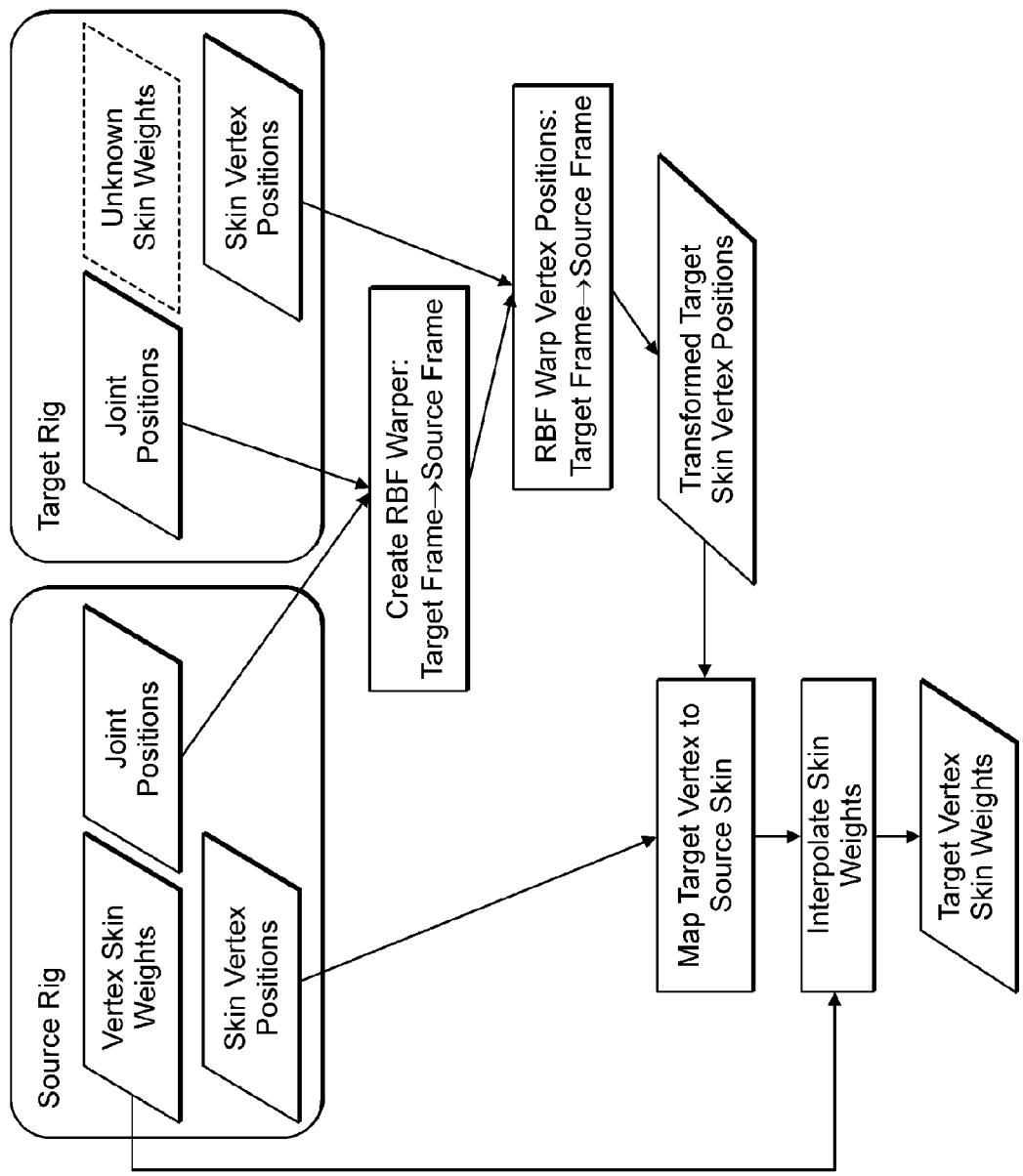
FIG. 6 is a flow chart depicting a skin weight transfer process in accordance with an embodiment of the present invention.

Automatic methods for transferring skin weights from a source skin mesh to a target skin mesh, in accordance with other embodiments of the present invention, are now described with reference to FIG. 6.

In most cases, source and target rigs can be expected to have skin meshes with differing shape and numbers of vertices. A one-to-one correspondence, therefore, does not exist between source and target skin mesh vertices. A position on the source skin must be found for each target skin vertex. From this position, a skin weight vector can be interpolated for every target skin vertex using neighboring source skin weights. Before interpolation positions can be found, it is necessary to align the skins meshes as closely as possible. Although no correspondence exists between mesh vertices, there is a known correspondence between source and target joints. This correspondence can be used to transform the target mesh so it aligns closely to the source mesh. The required transformation may be non-rigid. For this reason, a three-dimensional RBF mapping target joint positions to their corresponding source joint positions is calculated (as described with reference to equations (1) and (2) above). The target skin vertices are then transformed with the RBF function to align closely with the source skin.

Despite applying RBF alignment, the target skin vertices may not lie precisely on the source skin. A further step is advantageously applied in order to calculate a position on the source skin for each target vertex. To that end, a source skin polygon is chosen according to a criterion, of which the following procedure is a preferred example. Each transformed target vertex (in the space of the source skin) has an associated surface normal for rendering purposes. This normal is used to find candidate interpolation positions on the source skin as follows. A list is generated of all source skin polygons (typically triangles) which intersect with the normal to the transformed target vertex. is found. I.e., a source skin polygon is considered to intersect a particular normal if the intersection of the normal with the plane of the polygon lies within the polygon.

The intersecting polygons are then ordered by Euclidian distance from the transformed target vertex. Starting with the closest polygon, if the normal of the polygon and the normal of the target vertex are consistent ((a·b)>t, where a and b are the two normals and t>0 is a consistency threshold, and the dot product is a standard scalar product) the polygon is accepted. If the normals are not consistent, the next closest intersecting polygon is tested, until either a polygon has been accepted, or no further intersections are available. If a polygon was accepted, the in-plane 2-D coordinates of the intersection point are calculated. A 2-D bi-linear interpolation of the source skin weight vectors at the polygon vertices is applied to determine the target vertex skin weights. At the end of the process, a 3-D nearest neighbour interpolation using calculated target weights is applied to determine skin weights for each vertex where no polygon was found. This process results in skin weights for all target skin vertices, interpolated from the source skin.

In preferred embodiments of the present invention, the disclosed methods for modifying the expression of an animated character are implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A computerized method for transferring an expression from a plurality of source rigs characterizing a plurality of animated characters to a target rig characterizing a target animated character, each of the source rigs and the target rig characterized by a set of joints and a skin mesh having a plurality of vertices, each vertex, in turn, characterized by a matrix of weights relating a response of the vertex to movement of associated joints, the method comprising:
  a. defining neutral and goal expressions for each of the multiplicity plurality of source rigs relative to a neutral expression of each source rig;
  b. building a mathematical model mapping neutral shape to goal expression offsets on a basis of the neutral and goal expressions defined for the plurality of source rigs;
  c. applying the mathematical model to an unseen neutral expression shape to calculate required expression offsets; and
  d. vectorially adding the calculated set of offsets to a neutral expression of the target rig in such a manner as to implement the goal expression on the target rig, thereby transforming the target rig;
  e. transferring a set of skin weights between a selected source rig of the plurality of source rigs and the target rig, the target rig characterized by an associated target skin;
  f. mapping joints of the target rig to joints of the selected source rig of the plurality of source rigs by means of a transform function derived on the basis of interpolation;
  g. transforming vertices of the associated target skin by means of the said transform function thereby deriving a plurality of transformed target vertices;

h. identifying a plurality of source skin polygons intersecting a normal to a specified transformed target vertex;
i. choosing a source skin polygon to associate with each transformed target vertex; and
j. identifying each transformed target vertex with the intersection of a normal to said transformed target vertex with the chosen source skin polygon.

2. A non-transitory computer readable medium for storing an expression from a plurality of source rigs characterizing a plurality of animated characters to a target rig characterizing a target animated character, each of the source rigs and the target rig characterized by a set of joints and a skin mesh having a plurality of vertices, with each vertex, in turn, characterized by a matrix of weights relating a response of the vertex to movement of associated joints, the non-transitory computer readable medium having computer readable program code thereon, the computer readable program code comprising:

a. a computer code module for defining neutral and goal expressions for each of the plurality of source rigs relative to a neutral expression of each source rig;
b. a computer code module for building a mathematical model mapping neutral shape to goal expression offsets;
c. a computer code module for applying the mathematical model to an unseen neutral expression shape to calculate required expression offsets; and
d. a computer code module for vectorially adding the calculated set of offsets to a neutral expression of the target rig in such a manner as to implement the goal expression on the target rig, thereby transforming the target rig;
e. a computer code module for transferring a set of skin weights between a single source rig and the target rig, the target rig characterized by an associated target skin;
f. a computer code module for mapping joints of the target rig to joints of the single source rig by means of a transform function derived on the basis of interpolation;
g. a computer code module for transforming vertices of the target skin by means of the said transform function thereby deriving a plurality of transformed target vertices;
h. a computer code module for identifying a plurality of source skin polygons intersecting a normal to a specified transformed target vertex;
i. a computer code module for choosing a source skin polygon to associate with each transformed target vertex; and
j. a computer code module for identifying each transformed target vertex with the intersection of a normal to said transformed target vertex with the chosen source skin polygon.

* * * * *